(12) United States Patent
Hatade et al.

(10) Patent No.: US 7,492,534 B2
(45) Date of Patent: Feb. 17, 2009

(54) IMAGING OPTICAL SYSTEM INCLUDING OPTICAL ELEMENT HAVING DISCONTINUOUS PLANE

(75) Inventors: Kouei Hatade, Osaka (JP); Norihisa Sakagami, Osaka (JP)

(73) Assignee: Nalux Co., Ltd., Osaka (JP)

( * ) Notice: Subject to any disclaimer, the term of this patent is extended or adjusted under 35 U.S.C. 154(b) by 63 days.

(21) Appl. No.: 11/661,864

(22) PCT Filed: Sep. 1, 2005

(86) PCT No.: PCT/JP2005/016040

§ 371 (c)(1),
(2), (4) Date: Jun. 8, 2007

(87) PCT Pub. No.: WO2006/025505

PCT Pub. Date: Mar. 9, 2006

(65) Prior Publication Data

US 2008/0068731 A1    Mar. 20, 2008

(30) Foreign Application Priority Data

Sep. 3, 2004    (JP) .............................. 2004-256573

(51) Int. Cl.
G02B 9/00    (2006.01)
(52) U.S. Cl. ........................ 359/796; 359/741; 359/742; 359/743; 359/718; 359/719
(58) Field of Classification Search ................. 359/741, 359/742, 743, 796, 718, 719
See application file for complete search history.

(56) References Cited

U.S. PATENT DOCUMENTS 6,934,094 B2 *    8/2005    Kojima et al. ............... 359/717

FOREIGN PATENT DOCUMENTS

| JP | 5-014602 | 1/1993 |
| JP | 11-249007 | 9/1999 |
| JP | 2000-171705 | 6/2000 |
| JP | 2002-055273 | 2/2002 |

OTHER PUBLICATIONS

International Search Report for International Appln No. PCT/IB2005/016040 dated Nov. 8, 2005.

* cited by examiner

*Primary Examiner*—Evelyn A. Lester
(74) *Attorney, Agent, or Firm*—Squire, Sanders & Dempsey L.L.P.

(57) ABSTRACT

An imaging optical system capable of moving a meridian image plane further closer to an ideal imaging plane vertical to an optical axis with the number of lenses kept constant. At least one plane of at least one optical element and including at least one optical element is divided into at least one zonal area surrounding an optical axis and a center area including the optical axis. When the first area of a meridian image plane, on which a meridian ray of light passing through one of the at least one zonal area and the center area images, displaces to an image side from the reference image plane of the imaging optical system and the second area of a meridian image plane, on which a meridian ray of light passing through the other of the at least one zonal area and the center area images, displaces to an object side from the reference image plane of the imaging optical system, the boundary between the at least one zonal area and the center area is made discontinuous so that the first and second areas approach the reference image plane.

15 Claims, 13 Drawing Sheets

IMAGING OPTICAL SYSTEM INCLUDING OPTICAL ELEMENT HAVING DISCONTINUOUS PLANE

TECHNICAL FIELD

The present invention relates to an imaging optical system for a solid-state image sensor lens used in a digital camera, a cellular phone with an imaging function, a scanner, and the like and a scanning lens used in a laser printer and the like.

BACKGROUND ART

A demand of miniaturization is increasingly grown in the solid-state image sensor lens used in mobile devices such as the digital camera and the cellular phone with the imaging function and in the scanning optical system used in printing devices such as the laser printer. Therefore, a demand of the miniaturization is also increased in the imaging optical system used in these devices. Examples of a method of miniaturizing the imaging optical system includes a technique of decreasing the number of lenses, a technique of shortening a distance between the lens and an image surface, and a technique of increasing an angle of view. However, in such techniques, there is generated a problem that a field curvature or astigmatism is increased.

Conventionally, in the method of decreasing the field curvature or astigmatism, for example, a shape of lens in the imaging optical system is optimized, the number of lenses is increased, and glass whose variations in refractive index and variance are large is used as a lens material.

However, in the conventional method, because a structure of the imaging optical system becomes complicated, the demand of the miniaturization cannot be satisfied, and cost is increased from the viewpoints of material and forming.

In an image reading apparatus such as an image scanner, a copying machine, and a facsimile, there is proposed an image reading apparatus in which the astigmatism is well corrected by providing an optical member whose vertical refractive power is rotationally asymmetric in relation to an optical axis in an optical path between an imaging system and image reading means (for example, see Japanese Patent Application Laid-Open (JP-A) No. 5-14602). In an image-reading imaging lens which images information on original image onto the image reading apparatus, there are proposed an imaging lens in which at least one surface in plural surfaces constituting the imaging lens has the refractive power is rotationally asymmetric in relation to the optical axis and an image reading apparatus with the imaging lens (for example, see JP-A No. 2000-171705). However, in the image reading apparatus proposed in JP-A No. 5-14602, it is necessary to arrange the new optical member in the optical path, which results in the problems that the entire apparatus is enlarged and the number of adjustment items is also increased during assembly. In the imaging lens and image reading apparatus proposed in JP-A No. 2000-171705, because the lens having a rotationally-asymmetric refractive index distribution is used, when the optical axis is set to a Z-axis, it is necessary to combine an X-axis lens and a Y-axis lens, which results in the problem that man-hour is increased during the assembly.

There is also proposed an image-pickup lens in which at least one surface is formed in a Fresnel surface such that the miniaturization can be achieved while the field curvature is suppressed (for example, see JP-A No. 2002-55273). However, the image-pickup lens has insufficient function from the standpoint of the decrease in astigmatism or field curvature.

In designing the compact imaging optical system used in the above applications, it is preferable that a meridional image surface onto which a meridional ray is imaged and a sagittal image surface onto which a sagittal ray is imaged be brought close to an ideal image surface (design image surface) which is of a plane perpendicular to the optical axis as much as possible.

FIG. 8 shows positions of the meridional image surface and sagittal image surface in the case of the one to three-lens configurations. In FIG. 8, a coordinate of a horizontal axis indicates the position in an optical axis direction, and a coordinate of a longitudinal axis indicates the position in an image height direction. Because the lens having rotational-symmetry in relation to the optical axis is used, the rotationally-symmetric meridional image surface and sagittal image surface are obtained when the position in the image height direction corresponding to the position in the optical axis direction is obtained. In the imaging optical systems having the one to three-lens configurations of FIG. 8, the meridional image surface shown by a dashed line and the sagittal image surface shown by a solid line are designed so as to be brought close to the ideal image surface (design image surface), shown by a longitudinal axis, which is of a plane perpendicular to the optical axis as much as possible.

FIGS. 5 to 7 show optical paths of the imaging optical systems having one to three-lens configurations.

As shown in FIG. 5, in a first conventional example, the imaging optical system includes one lens and one glass plate. The ray passing through a diaphragm from an object is transmitted through a first lens 1 and a glass plate 4 to reach a sensor surface 5. An incidence surface and an exit surface of the first lens 1 and an incidence surface and an exit surface of the glass plate 4 are referred to as second to fifth surfaces respectively. The second and third surfaces are defined by a single aspherical equation. The third surface includes DOE.

As shown in FIG. 6, in a second conventional example, the imaging optical system includes two lenses and one glass plate. The ray passing through the diaphragm from the object is transmitted through the first lens 1, a second lens 2 and the glass plate 4 to reach the sensor surface 5. The incidence surface and exit surface of the first lens 1, an incidence surface and an output plan of the second lens 2, and the incidence surface and exit surface of the glass plate 4 are referred to as second to fifth surfaces, eighth surface, and ninth surface respectively. The second to fifth surfaces are defined by a single aspherical equation. A diffractive element (diffraction grating, DOE) is provided in the fifth surface, i.e., the exit surface of the second lens 2 to correct chromatic aberration.

As shown in FIG. 7, in a first comparative example, the imaging optical system includes three lenses and one glass plate. The ray passing through the diaphragm from the object is transmitted through the first lens 1, the second lens 2, a third lens 3, and the glass plate 4 to reach the sensor surface 5. The incidence surface and exit surface of the first lens 1, the incidence surface and output plan of the second lens 2, an incidence surface and an output plan of the third lens 3, and the incidence surface and exit surface of the glass plate 4 are referred to as second to ninth surfaces respectively. The second to seventh surfaces are defined by a single aspherical equation. The diffractive element (diffraction grating, DOE) is provided in the fifth surface, i.e., the exit surface of the second lens 2 to correct the chromatic aberration.

Returning to FIG. 8, in the imaging optical system, as the number of lenses is increased to bring the meridional image surface and the sagittal image surface close to the ideal image surface, the curve (dashed line) indicating the meridional image surface and the curve (solid line) indicating the sagittal image surface are bent in the periphery of the straight line (longitudinal axis) indicating the ideal image surface. That is, the curve (dashed line) indicating the meridional image surface and the curve (solid line) indicating the sagittal image surface have convex portions on an image side and an object side of the straight line (longitudinal axis) indicating the ideal image surface. Particularly, the curve (dashed line) indicating the meridional image surface has the remarkable convex portions on the image and object sides of the straight line (longitudinal axis) indicating the ideal image surface.

Conventionally, it is difficult that the meridional image surface having the remarkable convex portions on the image and object sides is brought close to the ideal image surface perpendicular to the optical axis while the number of lenses is kept constant.

DISCLOSURE OF THE INVENTION

There are needs for the imaging optical system in which the meridional image surface can further be brought close to the ideal image surface perpendicular to the optical axis while the number of lenses is kept constant.

An imaging optical system according to the invention which has at least one lens, at least one surface of the at least one lens being divided into at least one band region surrounding a periphery of an optical axis and a center region including the optical axis, wherein a step is provided at a boundary between the at least one band region and the center region such that a first region and a second region of a meridional image surface are brought close to a reference image surface of the imaging optical system, when the first region is displaced from the reference image surface toward an image side while the second region is displaced from the reference image surface toward an object side, a meridional ray transmitted through at least one of the at least one band region and the center region being imaged onto the first region in the meridional image surface, a meridional ray transmitted through the other region of the at least one band region and the center region being imaged onto the second region in the meridional image surface.

In the imaging optical system according to the invention, the position, the orientation, and the size of the step at the boundary of the at least one band region and the center region are adjusted while the number of lenses is kept constant. Therefore, the meridional image surface can be brought close to the ideal image surface perpendicular to the optical axis. Because the imaging optical system of the first aspect of the invention has the above-mentioned characteristics, the imaging optical system of the first aspect of the invention can widely be utilized in the imaging optical systems for the solid-state image sensor lens used in the digital camera, the cellular phone with the imaging function, the scanner, and the like and the scanning lens used in the laser printer and the like, in which conventionally the field curvature and/or the astigmatism become troublesome.

In the imaging optical system according to an embodiment of the invention, a size of the step is defined by magnitude of the displacements of the first and second regions from the reference image surface, and an orientation of the step is defined based on which orientations the first and second regions are displaced toward from the reference image surface, whether the surface including the step is located on the image side or the object side, and whether the surface including the step is formed in a concave surface or a convex surface. Accordingly, the position, the orientation, and the size can appropriately be obtained from the meridional image surface of the imaging optical system.

In the imaging optical system according to another embodiment of the invention, the surfaces constituting the at least one band region and center region are separately obtained. Accordingly, the shapes of the meridional image surface and sagittal image surface can be adjusted by separately adjusting the shapes of the surfaces constituting the at least one band region and center region.

In the imaging optical system according to another embodiment of the invention, the step in an optical axis direction is obtained by changing a position of an origin on each surface, when the surfaces constituting the at least one band region and center region including the optical axis are expressed by a defining equation in which an intersection point of each surface and the optical axis is set to the origin. Accordingly, the step in the optical axis direction can easily be adjusted by changing the position of the origin on each surface.

In the imaging optical system according to another embodiment of the invention, shapes of the surfaces are separately obtained by changing a defining equation of the surfaces constituting the at least one band region and center region including the optical axis, when the surfaces constituting the at least one band region and center region are expressed by the defining equation in which an intersection point of each surface and the optical axis is set to the origin. Accordingly, the shapes of the surfaces are separately adjusted by changing the defining equation of the surfaces constituting the at least one band region and center region, which allows the shape of the meridional image surface to be adjusted.

In the imaging optical system according to another embodiment of the invention, the surfaces constituting the at least one band region and center region are defined by an aspherical equation. Accordingly, the shapes of the surfaces are separately adjusted by separately adjusting the coefficients of the aspherical equation of the surfaces constituting the at least one band region and center region, which allows the shapes of the meridional image surface and sagittal image surface to be adjusted.

In the imaging optical system according to another embodiment of the invention, an inclination of a step surface at the boundary between the center region and the band region or between the plural band regions is obtained as a function of an angle of a ray transmitted through the boundary portion. Accordingly, the influence of the discontinuous step on the aberration can be released by bringing the inclination of the surface close to the angle of the ray transmitted through the boundary portion.

In the imaging optical system according to another embodiment of the invention, the inclination of the step surface is obtained with respect to the optical axis so as to be set to an angle ranging from a minimum angle to a maximum angle of the ray incident to the step surface, when the step surface at the boundary between the center region and the band region or between the plurality of band regions is parallel to the optical axis. Accordingly, the influence of the discontinuous step on the aberration can be released by bringing the inclination of the surface close to the angle of the ray transmitted through the boundary portion.

In the imaging optical system according to another embodiment of the invention, the inclination of the step surface is obtained with respect to the optical axis so as to be set to an average angle of the ray incident to the step surface, when the step surface at the boundary between the center region and the band region or between the plurality of band regions is parallel to the optical axis. Accordingly, the influence of the discontinuous step on the aberration can be released by bringing the inclination of the surface close to the angle of the ray transmitted through the boundary portion.

In the imaging optical system according to another embodiment of the invention, the at least one band region and the periphery of the center region are defined by a circle having the center located on the optical axis. Accordingly, the boundary of the regions can be obtained by obtaining the radius of the circle constituting the periphery of the region.

In the imaging optical system according to another embodiment of the invention, a diffractive element is provided in at least one surface of at least one optical element. Accordingly, the chromatic aberration can be corrected by utilizing the effect of the negative Abbe number possessed by the diffractive element.

In the imaging optical system according to another embodiment of the invention, the at least one band region and the center region are included in a surface located closest to the image side. Accordingly, the shape of the meridional image surface can easily be adjusted.

An imaging optical system according to the invention which has at; least one lens, at least one surface of the at least one lens being divided into at least one band region surrounding a periphery of an optical axis and a center region including the optical axis, wherein a step is provided at a boundary between the at least one band region and the center region such that a region of a meridional image surface is brought close to a reference image surface of the imaging optical system, when the region is displaced from the reference image surface toward an image side or an object side, a meridional ray transmitted through at least one of the at least one band region and the center region being imaged onto the region in the meridional image surface.

In the imaging optical system according to the invention, the position, the orientation, and the size of the step at the boundary of the at least one band region and the center region is adjusted while the number of lenses is kept constant. Therefore, the meridional image surface can be brought close to the ideal image surface perpendicular to the optical axis. Because the imaging optical system of the second aspect of the invention has the above characteristics, the imaging optical system of the second aspect of the invention can widely be utilized in the imaging optical systems for the solid-state image sensor lens used in the digital camera, the cellular phone with the imaging function, the scanner, and the like and the scanning lens used in the laser printer and the like, in which conventionally the field curvature and/or the astigmatism become troublesome.

In the imaging optical system according to another embodiment of the invention, a size of the step is defined by magnitude of the displacements of the region of the meridional image surface from the reference image surface, and an orientation of the step is defined based on which orientation the region is displaced toward from the reference image surface, which the surface including the step is located on the image side or the object side, and which the surface including the step is formed in a concave surface or a convex surface. Accordingly, the position, the orientation, and the size can appropriately be obtained from the meridional image surface of the imaging optical system.

In the imaging optical system according to another embodiment of the invention, the surfaces constituting the at least one band region and center region are separately obtained. Accordingly, the shapes of the surfaces constituting the at least one band region and center region can separately be adjusted, which allows the shapes of the meridional image surface and sagittal image surface to be adjusted.

BEST MODES FOR CARRYING OUT THE INVENTION

First a discontinuous boundary of the invention will be described. A step in an optical axis direction may exist at the boundary between the center region and the band region or at the boundary between plural band regions. A structure of a step surface will be described below. A flare is generated by a ray incident to the step surface. In the case where the step surface is parallel to the optical axis, in order to reduce the flare, it is preferable that the inclination of the step surface with respect to the optical axis be defined so as to become an angle within the range of the minimum angle to the maximum angle of the ray incident to the step surface. Alternatively, in the case where the step surface is parallel to the optical axis, the inclination of the step surface with respect to the optical axis may be defined so as to become an average angle of the ray incident to the step surface.

Numerical examples will be described below.

FIRST NUMERICAL EXAMPLE

A first numerical example which is of an embodiment of the invention will be described compared with the first comparative example.

Figure 1:
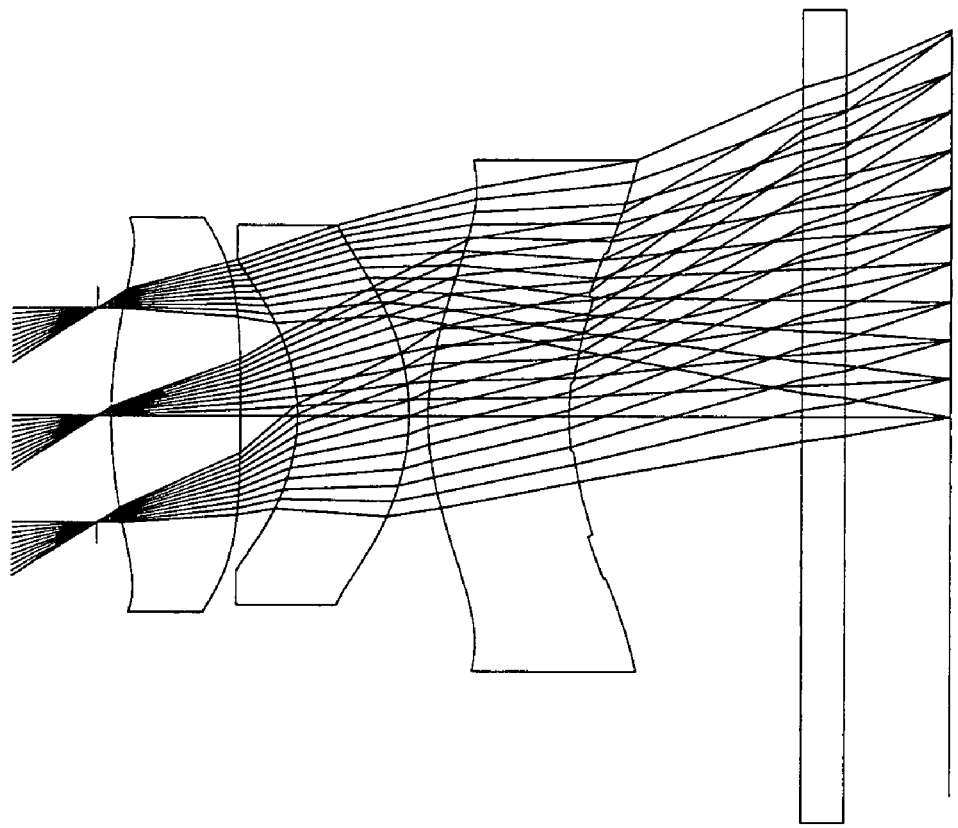
FIG. 1 is a view showing an optical path of an imaging optical system (first numerical example) according to one embodiment of the invention.

FIG. 1 shows an optical path of an imaging optical system of the first numerical example. As shown in FIG. 1, the imaging optical system of the first numerical example includes three lenses and one glass plate. The incidence ray passing through a diaphragm from an object is transmitted through a first lens 1, a second lens 2, a third lens 3, and a glass plate 4 to reach a sensor surface 5. An incidence surface and an exit surface of the first lens 1, an incidence surface and an output plan of the second lens 2, an incidence surface and an output plan of the third lens 3, and an incidence surface and an exit surface of the glass plate 4 are referred to as second to ninth surfaces respectively. Each of the second to sixth surfaces is defined by a single aspherical equation. A diffractive element (diffraction grating, DOE) which corrects chromatic aberration is provided in the fifth surface, i.e., the exit surface of the second lens 2. The seventh surface, i.e., the exit surface of the third lens 3 is an astigmatism correction surface, i.e., a surface in which at least one band region surrounding a periphery of the optical axis and the center region including the optical axis are provided. The detailed seventh surface will be described below.

Figure 9:
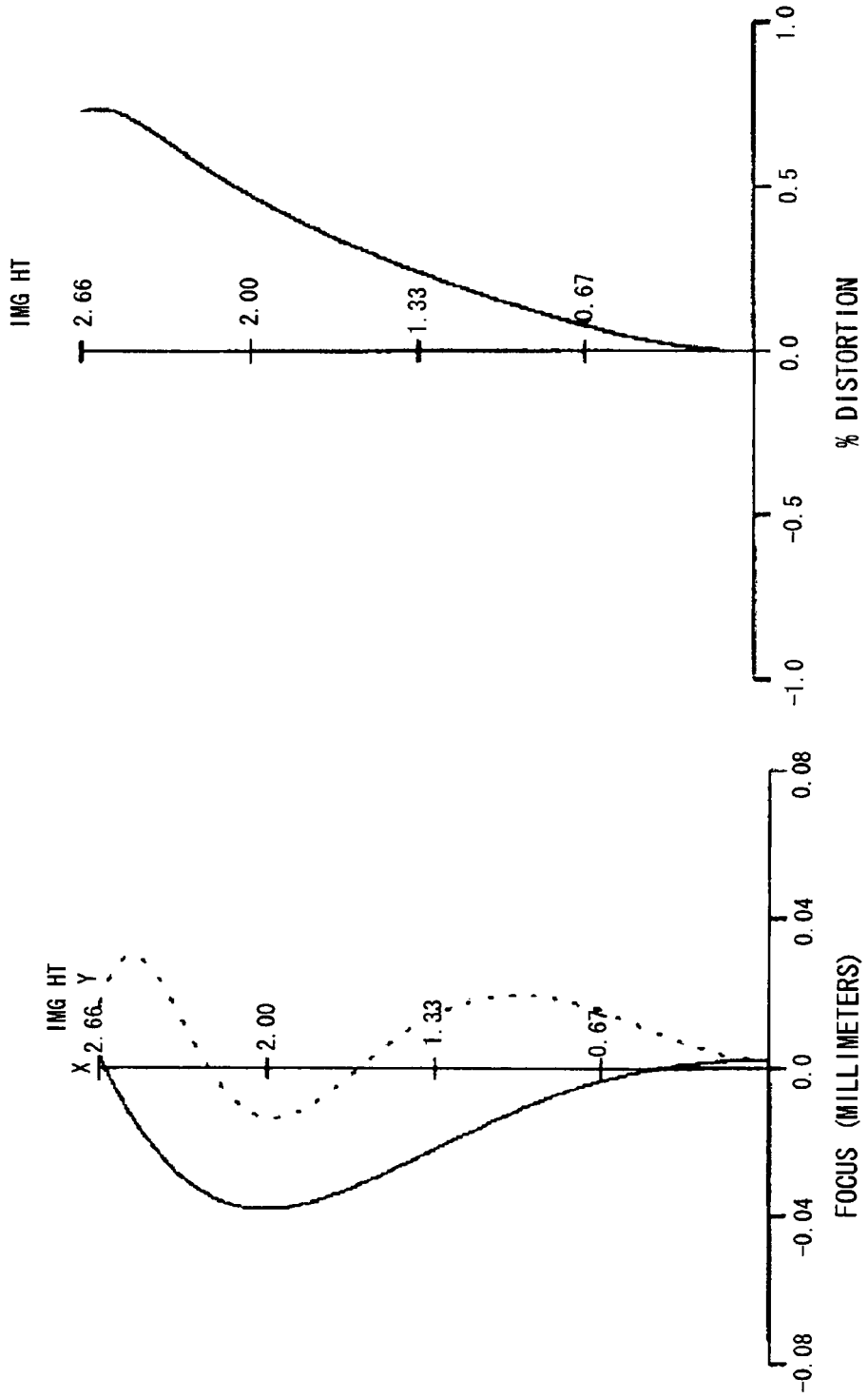
FIG. 9 is a view showing aberration of the imaging optical system of the first comparative example.

The curved state of the meridional image surface is checked in FIG. 9. FIG. 9 shows enlarged aberration of the first comparative example. Referring to FIG. 9, the dashed line indicating the meridional image surface has three convex portions of a convex portion orientated toward the image side, a convex portion orientated toward the object side, and a convex portion orientated toward the image side in the order in which the convex lens is located closer to the optical axis.

Then, a peak position of the convex portion in an image height direction is checked. The peaks of the convex portion are located at the image heights of 1.0 (mm), 2.0 (mm), and 2.5 (mm).

On the other hand, in FIG. 9, the image heights in which defocusing (out-of-focus from design image surface) becomes 0 (mm) are located at the image heights of 0 (mm), 1.65 (mm), and 2.2 (mm).

At this point, it is assumed that the discontinuous boundary is provided in the seventh surface such that the dashed line indicating the meridional image surface is brought close to the design image surface position. Then, the position on the meridional image surface corresponding to the discontinuous boundary on the seventh surface is obtained. For example, the discontinuous boundary can be located at an intermediate position between the position where the meridional ray collected onto the image height having the defocusing of 0 (mm) is transmitted through the seventh surface and the position where the meridional ray collected onto the image height corresponding to the peak of the convex portion of the curve indicating the meridional image surface is transmitted through the seventh surface. Alternatively, the discontinuous boundary may be located at the position where the meridional ray collected onto the image height having the defocusing of 0 (mm) is transmitted through the seventh surface. Alternatively, the discontinuous boundary may be located at the intermediate position between the position where the meridional ray collected onto the image height corresponding to the peak of the convex portion orientated toward the image side is transmitted through the seventh surface and the position where the meridional ray collected onto the image height corresponding to the peak of the convex portion orientated toward the object side is transmitted through the seventh surface.

Because a defect is generated in a paraxial computation when the center region including the optical axis is moved toward the optical axis direction, the center region including the optical axis is fixed, and the fixed center region is set to a reference. In the seventh surface, the discontinuous boundary in the periphery of the center region including the optical axis is defined by an intersection point of the surface and the meridional ray collected to the image height of 0.5 (mm) which is of the intermediate point between the image height of 0 (mm) in the meridional image surface and the first peak of 1 (mm) of the field curvature.

In the seventh surface, the outwardly next discontinuous boundary is defined by an intersection point of the surface and the meridional ray collected to the image height of 1.65 (mm) where the defocusing 0 (mm) is generated subsequent to the image height of 0 (mm) in the meridional image surface.

In the seventh surface, the outwardly next discontinuous boundary is defined by an intersection point of the surface and the meridional ray collected to the image height of 2.2 (mm) where the defocusing 0 (mm) is generated subsequent to the image height of 1.65 (mm) in the meridional image surface.

According to the computation of the position of the discontinuous boundary, in the seventh surface, the intersection point of the surface and the meridional ray collected to the image height of 0.5 (mm) is located at the distance of 0.24 (mm) from the optical axis. The intersection point of the surface and the meridional ray collected to the image height of 1.65 (mm) is located at the distance of 0.83 (mm) from the optical axis. The intersection point of the surface and the meridional ray collected to the image height of 2.2 (mm) is located at the distance of 1.13 (mm) from the optical axis. The seventh surface becomes a complex surface connected by the discontinuous boundaries defined in the above manner.

The seventh surface of the embodiment is expressed by the following equations.

$$h = \sqrt{x^2 + y^2}$$ [Numerical expression 1]

$$c_j = \frac{1}{R_j}$$

$$Z_j = \frac{c_j h^2}{1 + \sqrt{1 - (1+k_j)c_j^2 h^2}} + \sum_{i=1}^{m} A_{ij} h^i + d_j$$

Where z is an optical axis, x and y are a coordinate of a plane perpendicular to the optical axis, k is a constant defining a shape of a quadratic curve, c is a center curvature, A is a correction coefficient, and j is an identification number of a center region and a band region surrounding the center region. In the identification number j, the center region is set to 1, the number is consecutively assigned from the inside, and a center shift amount $d_j$ is defined based on an origin on the optical axis of the center region. It is assumed that the surface indicating the center region and at least one band region is an optical axis rotationally-symmetric surface in which the quadratic curve represented by the equations described above is rotated about the optical axis. That is, the seventh surface of the embodiment of the invention is expressed by the plural curves indicated by the identification numbers j of the center region and the band regions surrounding the center region. On the other hand, because the seventh surface of the first comparative example is not divided into the center region and the band regions surrounding the center region, the seventh surface is expressed by the single curve in which the center shift amount $d_j$ is set to zero.

In the embodiment, it is assumed that the equations indicating the shapes of the plural curves having the discontinuous boundary have the same expression. The discontinuous boundary is formed by a step, and the step is provided according to the center shift amount $d_j$.

The definition of the step will be described below. The collecting position on the image surface in the conventional optical system in which the aspheric surface is used is changed by providing the step. In the following description, the direction in which the ray advances is indicated by "positive", and the reversal direction is indicated by "negative".

For example, in the case where the step is provided on the image side of the lens having the convex surface (convergent power), when the image surface is corrected in one direction with the positive defocusing amount, a thickness of the lens is decreased and the center shift amount $d_j$ becomes negative.

For example, in the case where the step is provided on the object side of the lens having the convex surface (convergent power), when the image surface is corrected in one direction with the positive defocusing amount, the thickness of the lens is increased and the center shift amount $d_j$ becomes negative.

For example, in the case where the step is provided on the image side of the lens having the concave surface (divergent power), when the image surface is corrected in one direction with the positive defocusing amount, a thickness of the lens is increased and the center shift amount $d_j$ becomes positive.

For example, in the case where the step is provided on the image side of the lens having the concave surface (divergent power), when the image surface is corrected in one direction with the positive defocusing amount, a thickness of the lens is decreased and the center shift amount $d_j$ becomes positive.

When the image surface is corrected in the positive direction with the negative defocusing amount, the sign of the center shift amount $d_j$ becomes opposite.

In the embodiment, the step is provided on the image side of the lens, and the lens has the concave surface. Accordingly, when the image surface is corrected in one direction with the positive defocusing amount, the thickness of the lens is increased and the center shift amount $d_j$ becomes positive. When the image surface is corrected in the positive direction with the negative defocusing amount, the center shift amount $d_j$ becomes negative.

Specifically, the center shift amount $d_j$ in the center region is set to 0.0 (mm). The center shift amount $d_j$ in the outside band region is set to 0.02 (mm) because the defocusing amount possibly generated in the surface region is 0.02 (mm). Then, the center shift amount $d_j$ in the next outside band region is set to −0.02 (mm) because the defocusing amount possibly generated in the surface region is −0.02 (mm). The center shift amount $d_j$ in the outermost band region is set to 0.0 (mm) because the shape of the meridional image surface is not changed by the center shift amount in the outermost band region.

surface of J=1 $d_j$=0.0 (mm)

surface of J=2 $d_j$=0.02 (mm)

surface of J=3 $d_j$=−0.02 (mm)

surface of J=4 $d_j$=0.0 (mm)

Figure 2:
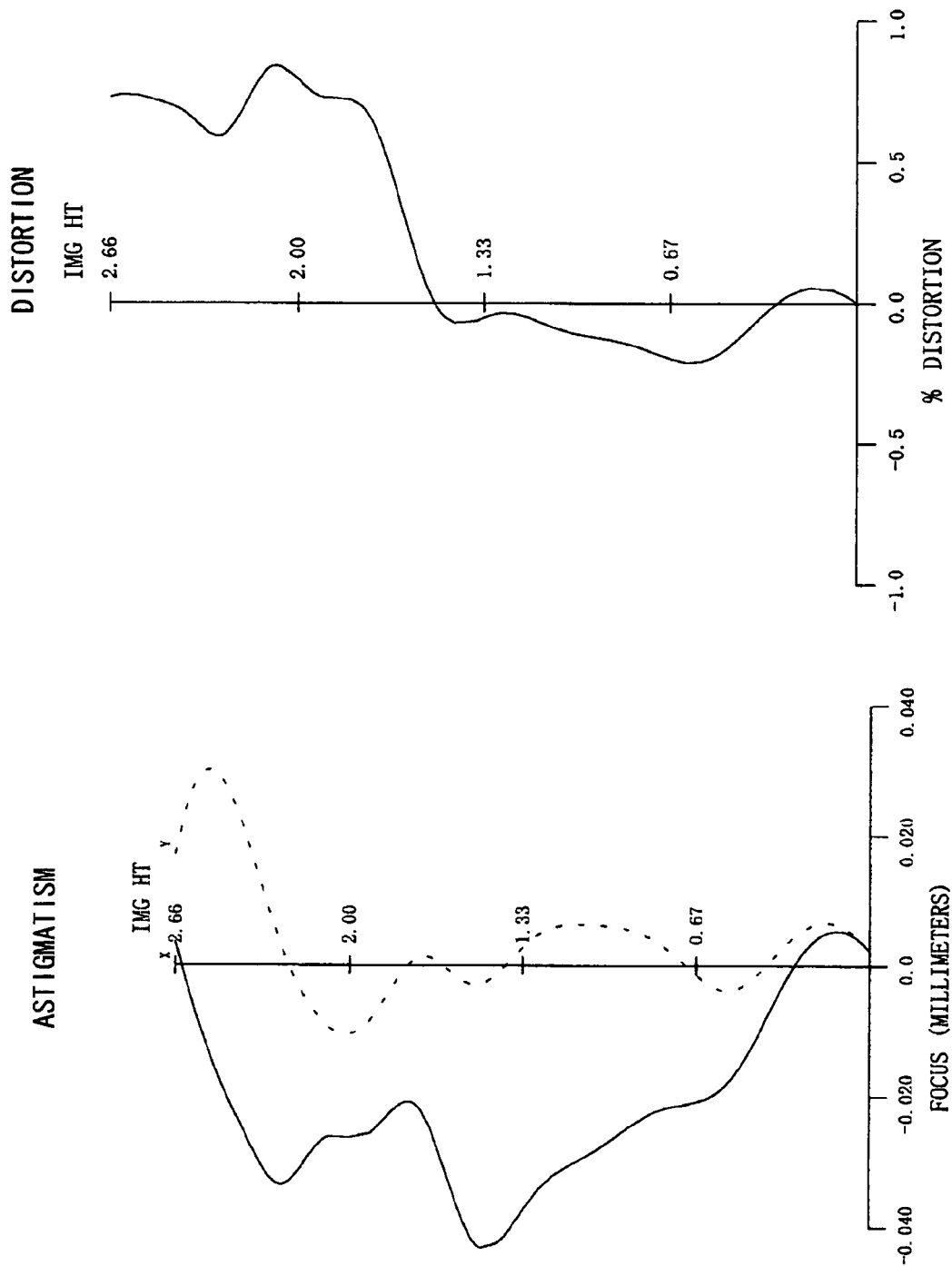
FIG. 2 is a view showing aberration of the imaging optical system (first numerical example) according to one embodiment of the invention.

FIG. 2 shows aberration of the imaging optical system of the first numerical example. When compared with the aberration of the first comparative example of FIG. 9, the curve expressing the meridional image surface indicated by the dashed line on the left of FIG. 2 is brought close to the image surface and the astigmatism is also decreased.

In the seventh surface of the first numerical example, as described above, the equations indicating the shapes of the plural curves having the discontinuous boundary have the same expression. However, the shapes of the plural curves in the seventh surface may separately be defined. In this case, the constant kj, the center curvature cj, the correction coefficient Aij which define the shape of the quadratic curve are obtained in each surface of j=1 to 6 such that the meridional image surface and the sagittal image surface on the left of FIG. 2 are brought close to the design image surface (longitudinal axis of FIG. 2).

SECOND NUMERICAL EXAMPLE

A second numerical example which is of an embodiment of the invention will be described compared with a second comparative example.

Figure 3:
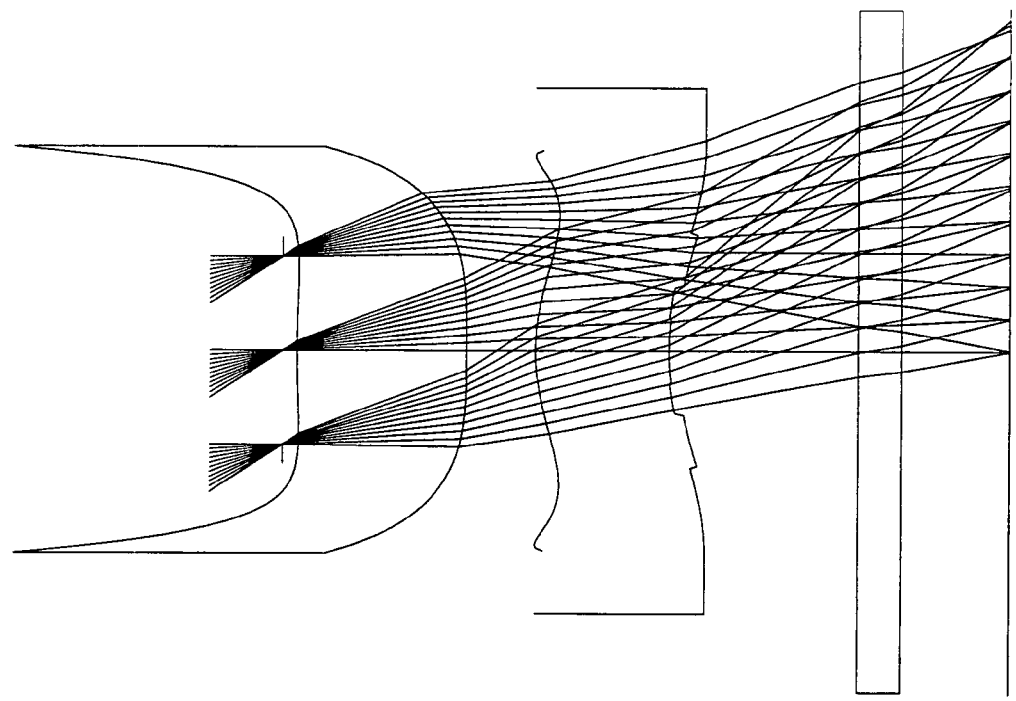
FIG. 3 is a view showing an optical path of an imaging optical system (second numerical example) according to another embodiment of the invention.

FIG. 3 shows an optical path of an imaging optical system of the second numerical example. As shown in FIG. 3, the imaging optical system of the second numerical example includes two lenses and one glass plate. The incidence ray passing through the diaphragm from the object is transmitted through the first lens 1, the second lens 2, and the glass plate 4 to reach the sensor surface 5. The incidence surface and exit surface of the first lens 1, the incidence surface and output plan of the second lens 2, and the incidence surface and exit surface of the glass plate 4 are referred to as second to seventh surfaces respectively. Each of the second to fourth surfaces is defined by a single aspherical equation. A diffractive element (diffraction grating, DOE) which corrects the chromatic aberration is provided in the third surface, i.e., the exit surface of the first lens 2. The fifth surface, i.e., the exit surface of the second lens 2 is an astigmatism correction surface, i.e., a surface in which at least one band region surrounding the periphery of the optical axis and the center region including the optical axis are provided. The detailed fifth surface will be described below.

Figure 10:
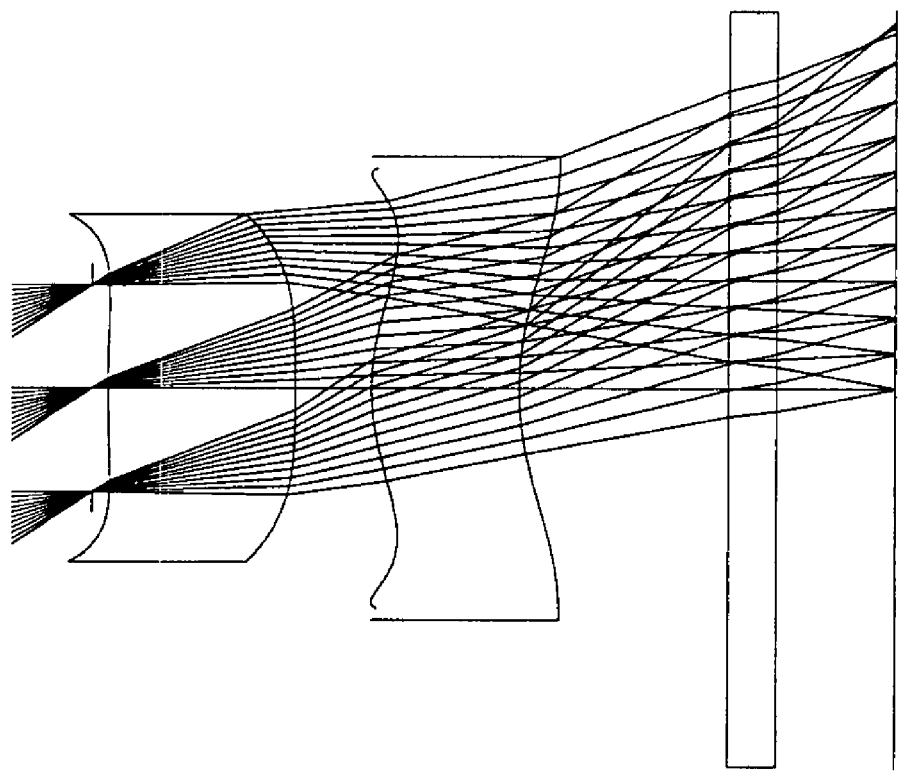
FIG. 10 is a view showing an optical path of an imaging optical system (second comparative example) having a two-lens configuration of the conventional technique.

FIG. 10 shows an optical path of an imaging optical system of a second comparative example. As shown in FIG. 10, as with the imaging optical system of the second numerical example, the imaging optical system of the second comparative example includes two lenses and one glass plate. The incidence ray passing through the diaphragm from the object is transmitted through the first lens 1, the second lens 2, and the glass plate 4 to reach the sensor surface 5. The incidence surface and exit surface of the first lens 1, the incidence surface and output plan of the second lens 2, and the incidence surface and exit surface of the glass plate 4 are referred to as second to seventh surfaces respectively. The second fifth surfaces are defined by the single aspherical equation respectively. The diffractive element (diffraction grating, DOE) which corrects the chromatic aberration is provided in the third surface, i.e., the exit surface of the first lens 2.

Figure 11:
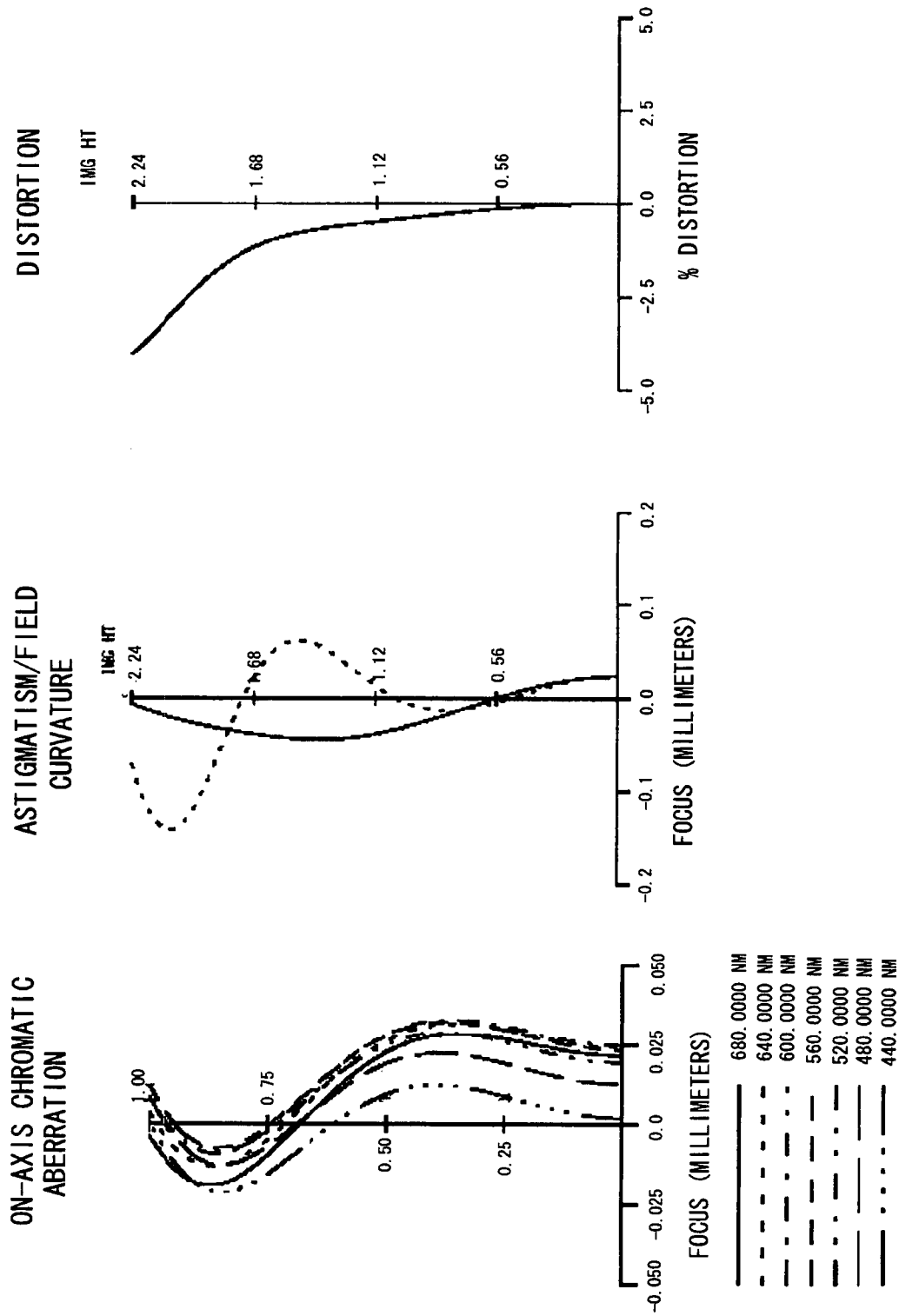
FIG. 11 is a view showing aberration of the imaging optical system of the second comparative example.

The curved state of the meridional image surface is checked in FIG. 11. FIG. 11 shows the aberration of the second comparative example. Referring to FIG. 11, the dashed line indicating the meridional image surface has three convex portions of a convex portion orientated toward the object side, a convex portion orientated toward the image side, and a convex portion orientated toward the object side in the order in which the convex lens is located closer to the optical axis.

Then, the peak position of the convex portion in the image height direction is checked. The peaks of the convex portion are located at the image heights of 0.8 (mm), 1.5 (mm), and 2.05 (mm).

On the other hand, in FIG. 11, the image heights in which defocusing (out-of-focus from design image surface) becomes 0 (mm) are located at the image heights of 0.5 (mm), 1.0 (mm), and 1.75 (mm).

At this point, it is assumed that the discontinuous boundary is provided in the seventh surface such that the dashed line indicating the meridional image surface is brought close to the design image surface position. Then, the position on the meridional image surface corresponding to the discontinuous boundary on the seventh surface is obtained. For example, the discontinuous boundary can be located at the intermediate position between the position where the meridional ray collected onto the image height having the defocusing of 0 (mm) is transmitted through the fifth surface and the position where the meridional ray collected onto the image height corresponding to the peak of the convex portion of the curve indicating the meridional image surface is transmitted through the fifth surface. Alternatively, the discontinuous boundary may be located at the position where the meridional ray collected onto the image height having the defocusing of 0 (mm) is transmitted through the fifth surface. Alternatively, the discontinuous boundary may be located at the intermediate position between the position where the meridional ray collected onto the image height corresponding to the peak of the convex portion orientated toward the image side is transmitted through the fifth surface and the position where the meridional ray collected onto the image height corresponding to the peak of the convex portion orientated toward the object side is transmitted through the fifth surface.

Because the defect is generated in the paraxial computation when the center region including the optical axis is moved toward the optical axis direction, the center region including the optical axis is fixed, and the fixed center region is set to a reference. In the fifth surface, the discontinuous boundary in the periphery of the center region including the optical axis is defined by the intersection point of the surface and the meridional ray collected to the image height of 0.5 (mm) in which defocusing 0 (mm) is generated.

In the fifth surface, the outwardly next discontinuous boundary is defined by the intersection point of the surface and the meridional ray collected to the image height of 1.0 (mm) where the defocusing 0 (mm) is generated subsequent to the image height of 0.5 (mm) in the meridional image surface.

In the fifth surface, the outwardly next discontinuous boundary is defined by an intersection point of the surface and the meridional ray collected to the image height of 1.75 (mm) where the defocusing 0 (mm) is generated subsequent to the image height of 1.0 (mm) in the meridional image surface.

According to the computation of the position of the discontinuous boundary, in the fifth surface, the intersection point of the surface and the meridional ray collected to the image height of 0.5 (mm) is located at the distance of 0.22 (mm) from the optical axis. The intersection point of the surface and the meridional ray collected to the image height of 1.0 (mm) is located at the distance of 0.44 (mm) from the optical axis. The intersection point of the surface and the meridional ray collected to the image height of 1.75 (mm) is located at the distance of 0.8 (mm) from the optical axis. The fifth surface becomes a complex surface connected by the discontinuous boundaries defined in the above manner.

The fifth surface of the embodiment is indicated by the same equations as the first numerical example.

In the embodiment, it is assumed that the equations indicating the shapes of the plural curves having the discontinuous boundary have the same expression. The discontinuous boundary is formed by the step, and the step is provided according to the center shift amount $d_j$.

In the embodiment, the step is provided on the image side of the lens, and the lens has the concave surface. Accordingly, when the image surface is corrected in one direction with the positive defocusing amount, the thickness of the lens is increased and the center shift amount $d_j$ becomes positive. When the image surface is corrected in the positive direction with the negative defocusing amount, the center shift amount $d_j$ becomes negative.

Specifically, the center shift amount $d_j$ in the center region is set to 0.0 (mm). The center shift amount $d_j$ in the outside band region is set to -0.01 (mm) because the defocusing amount possibly generated in the surface region is -0.01 (mm). Then, the center shift amount $d_j$ in the next outside band region is set to 0.05 (mm) because the defocusing amount possibly generated in the surface region is 0.05 (mm). The center shift amount $d_j$ in the outermost band region is set to 0.0 (mm) because the shape of the meridional image surface is not changed by the center shift amount in the outermost band region.

surface of J=1 $d_j$=0.0 (mm)

surface of J=2 $d_j$=-0.01 (mm)

surface of J=3 $d_j$=0.05 (mm)

surface of J=4 $d_j$=0.0 (mm)

Figure 4:
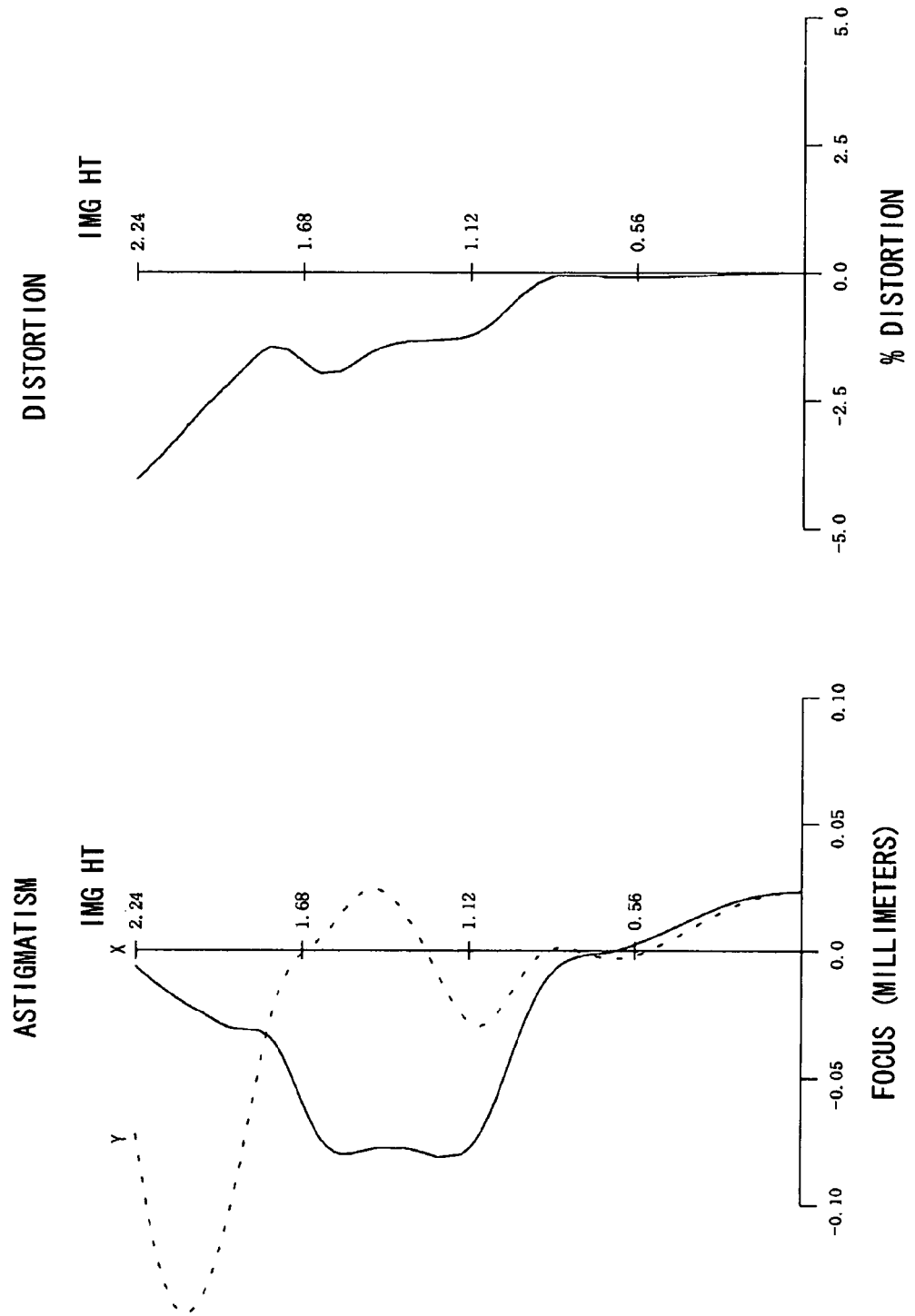
FIG. 4 is a view showing aberration of the imaging optical system (second numerical example) according to another embodiment of the invention.
Figure 5:
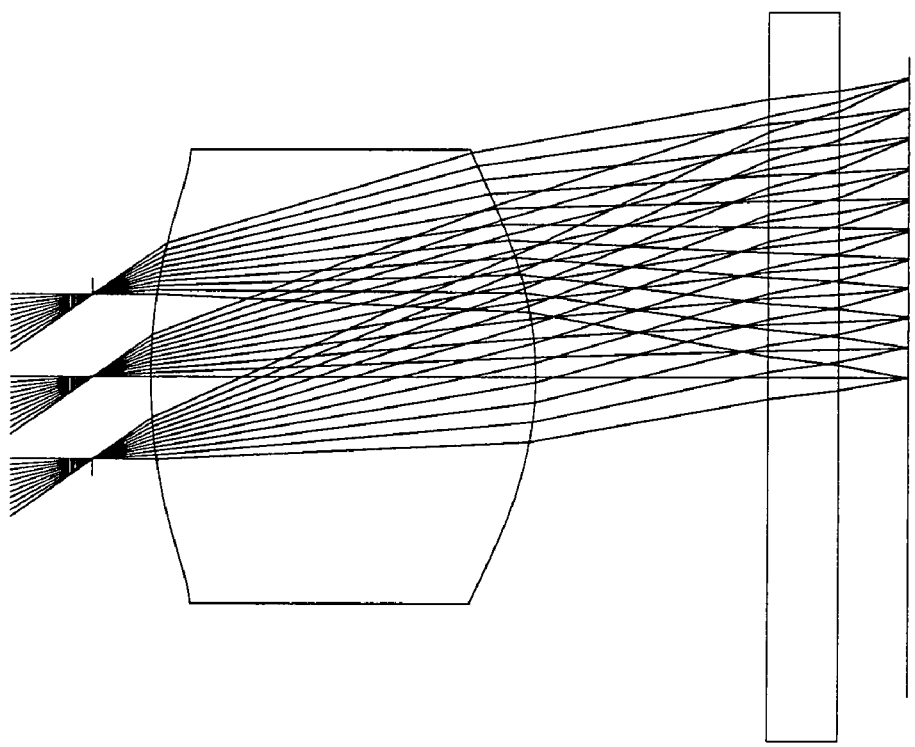
FIG. 5 is a view showing an optical path of an imaging optical system (first conventional example) having a one-lens configuration of a conventional technique.
Figure 6:
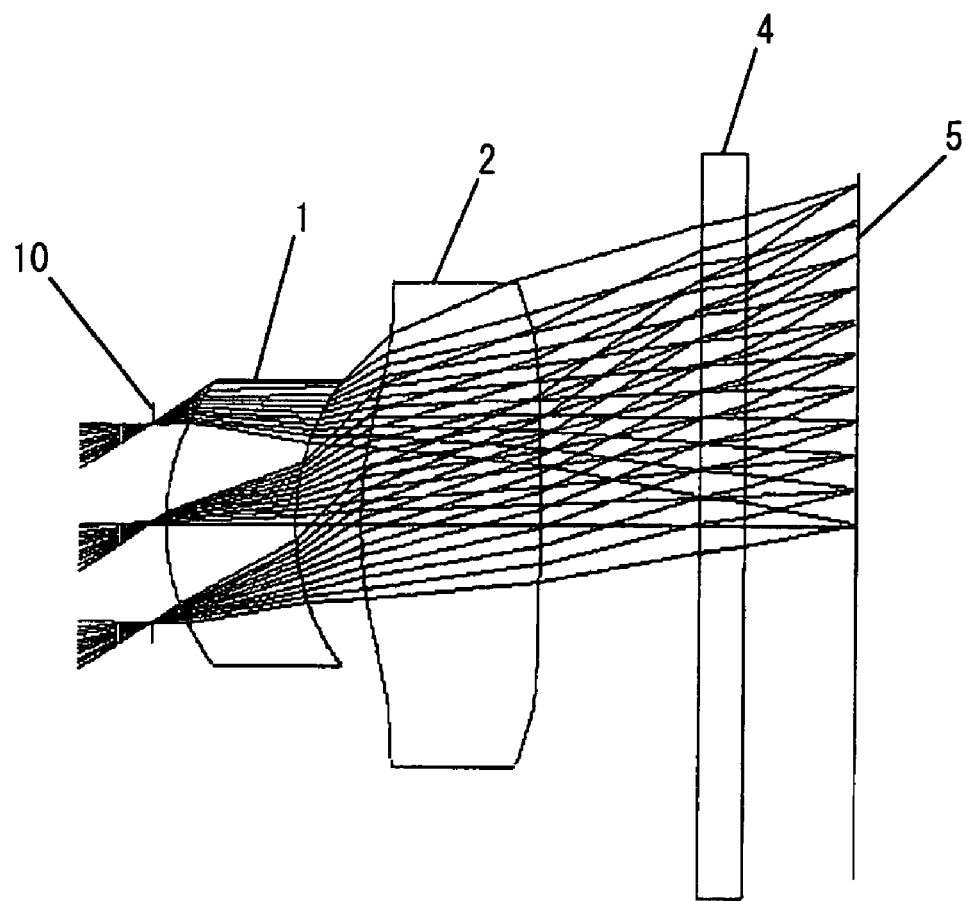
FIG. 6 is a view showing an optical path of an imaging optical system (second conventional example) having a two-lens configuration of the conventional technique.
Figure 7:
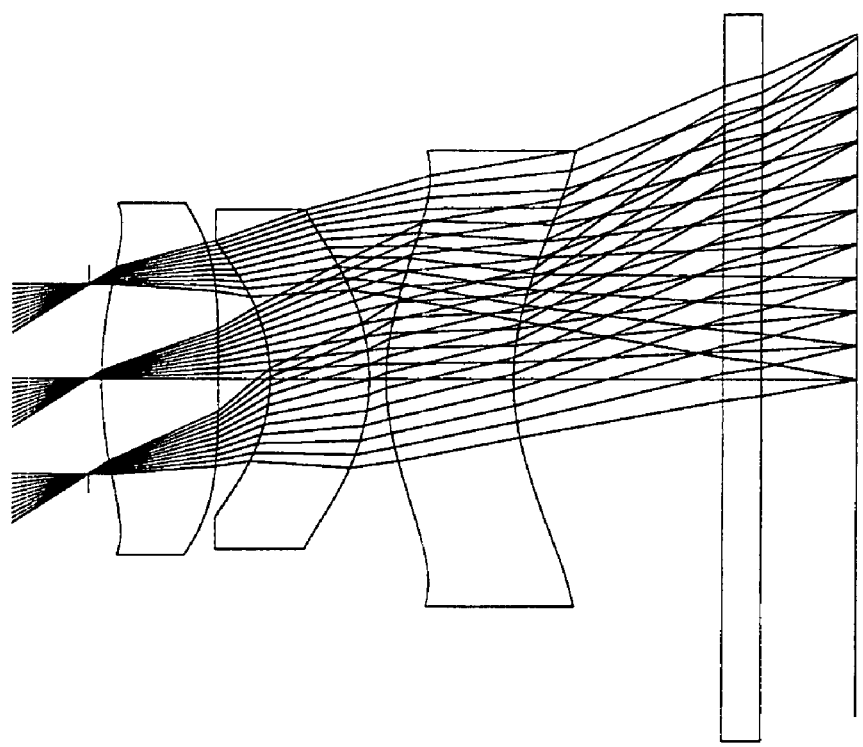
FIG. 7 is a view showing an optical path of an imaging optical system (first comparative example) having a three-lens configuration of the conventional technique.
Figure 8:
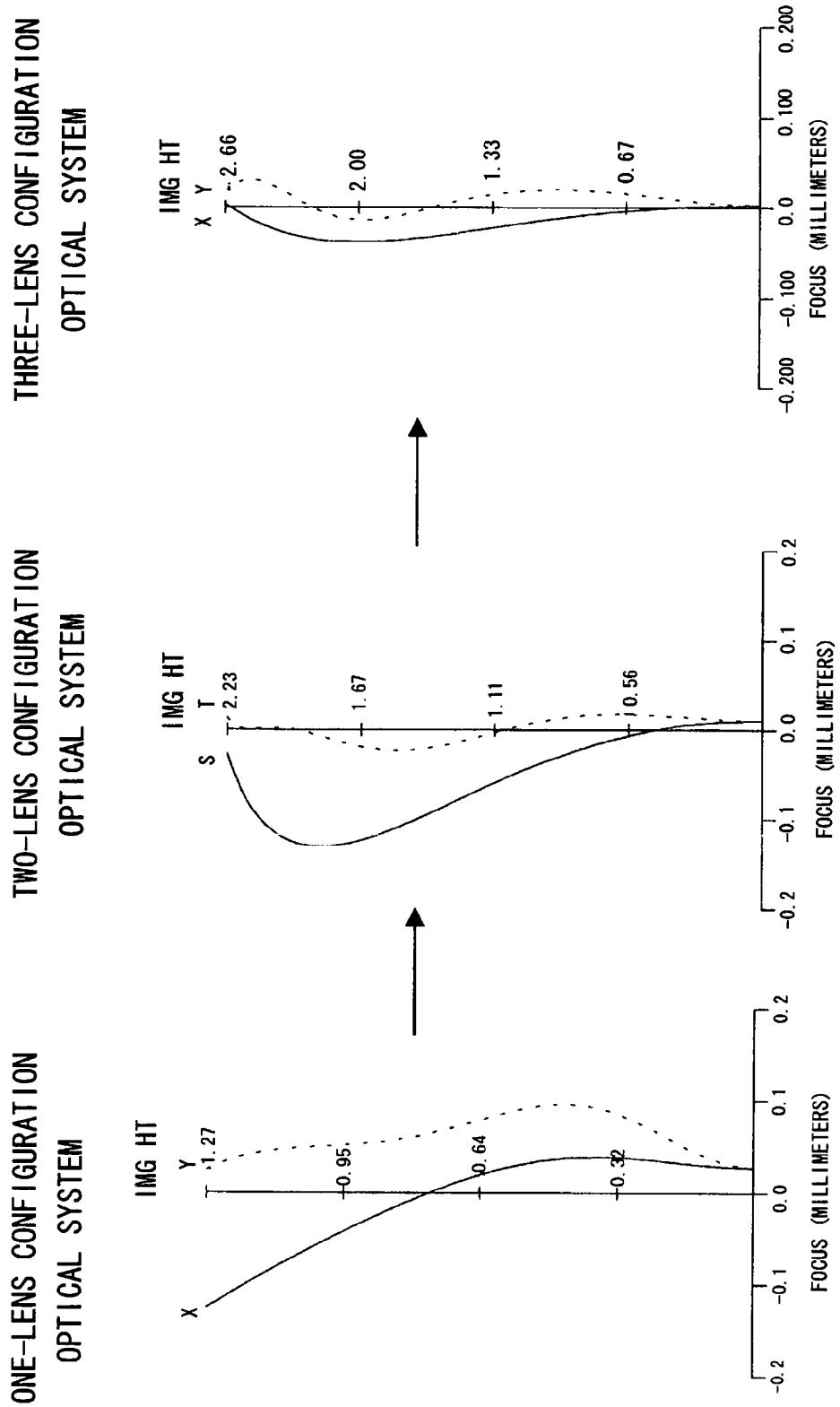
FIG. 8 is a view showing aberration of an imaging optical system of the conventional technique.

FIG. 4 shows aberration of the imaging optical system of the second numerical example. When compared with the aberration of the second comparative example of FIG. 11, the curve expressing the meridional image surface indicated by the dashed line on the left of FIG. 4 is brought close to the image surface and the astigmatism is also decreased.

In the fifth surface of the second numerical example, as described above, the equations indicating the shapes of the plural curves having the discontinuous boundary have the same expression. However, the shapes of the plural curves in the seventh surface may separately be defined. In this case, the constant kj, the center curvature cj, the correction coefficient Aij which define the shape of the quadratic curve are obtained in each surface of j=1 to 6 such that the meridional image surface and the sagittal image surface on the left of FIG. 4 are brought close to the design image surface (longitudinal axis of FIG. 2).

THIRD NUMERICAL EXAMPLE

An imaging optical system of a third numerical example has the same configuration as the imaging optical system of the first numerical example except for the configuration of the astigmatism correction surface (seventh surface). In astigmatism correction surface of the first numerical example, the coefficients defining the shapes of the surfaces j=1, 2, 3, and 4) divided by the steps are equal to one another (see Table 1). On the contrary, in the third numerical example, the coefficients defining the shapes of the surfaces (j=1, 2, 3, and 4) are changed such that the displacements of the meridional image surface and sagittal image surface from the reference image surface are decreased as much as possible (see Table 7). Specifically, in the optical simulation, the coefficients are changed such that a spot diameter is decreased on the design image surface. The step positions (surface innermost radius) are equal to each other in the first and third numerical examples, and step sizes (center shift amount $d_j$) are equal to each other in the first and third numerical examples (see Tables 1 and 7).

Figure 12:
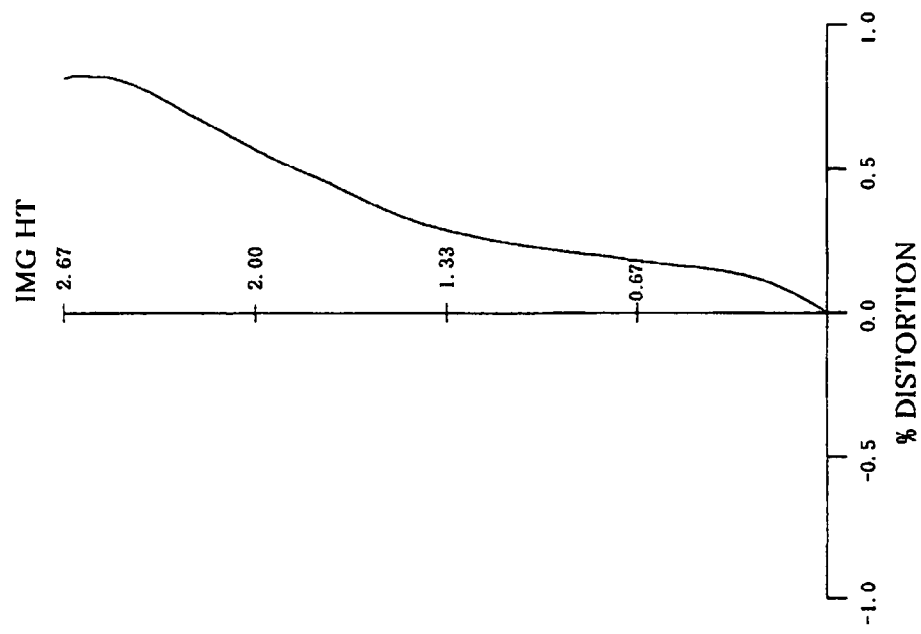
FIG. 12 is a view showing aberration of an imaging optical system according to a third numerical example.
Figure 12:
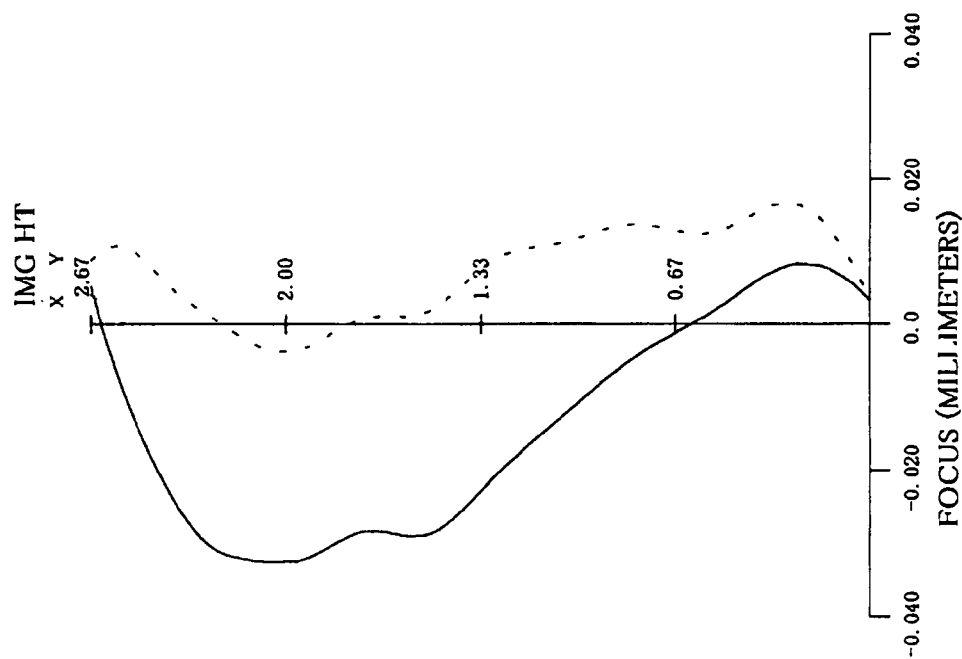

FIG. 12 shows aberration of an imaging optical system of a third numerical example.

FOURTH NUMERICAL EXAMPLE

An imaging optical system of a fourth numerical example has the same configuration as the imaging optical system of the second numerical example except for the configuration of the astigmatism correction surface (fifth surface). In astigmatism correction surface of the second numerical example, the coefficients defining the shapes of the surfaces (j=1, 2, 3, and 4) divided by the steps are equal to one another (see Table 3). On the contrary, in the fourth numerical example, the coefficients defining the shapes of the surfaces (j=1, 2, 3, and 4) are changed such that the displacements of the meridional image surface and sagittal image surface from the reference image surface are decreased as much as possible (see Table 8). Specifically, in the optical simulation, the coefficients are changed such that the spot diameter is decreased on the design image surface. The step positions (surface innermost radius) are equal to each other in the second and fourth numerical examples, and the step sizes (center shift amount $d_j$) are equal to each other in the second and fourth numerical examples (see Tables 3 and 8).

Figure 13:
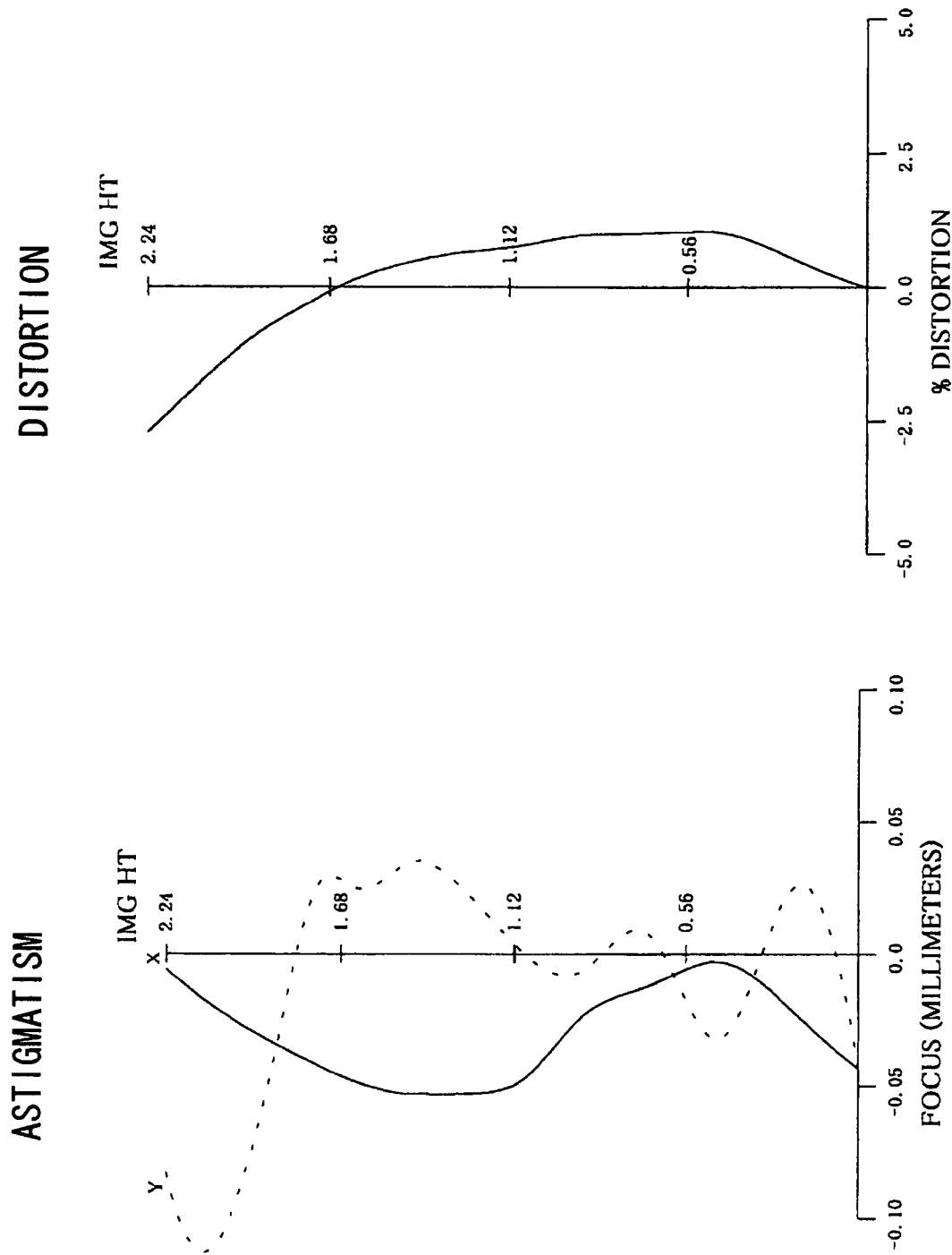
FIG. 13 is a view showing aberration of an imaging optical system according to a fourth numerical example.

FIG. 13 shows aberration of an imaging optical system of a fourth numerical example.

TABLE 1

First Numerical Example
Fno. = 2.8
Focal distance = 4.15 (mm)

| Surface number | Remarks | Surface spacing (mm) | Variance value (Abbe number) | Refractive index | Surface shape |
|---|---|---|---|---|---|
| Object surface | Object | 900 | 0 | 1 | |
| Diaphragm surface | Diaphragm | 0.100 | 0 | 1 | |
| Second surface | First lens | 0.912 | 52.85 | 1.546 | Aspheric surface |
| Third surface | First lens | 0.400 | 0 | 1 | Aspheric surface |
| Fourth surface | Second lens | 0.776 | 52.85 | 1.546 | Aspheric surface |
| Fifth surface | Second lens | 0.134 | 0 | 1 | DOE surface |
| Sixth surface | Third lens | 1.000 | 52.85 | 1.546 | Aspheric surface |
| Seventh surface | Third lens | 1.639 | 0 | 1 | Astigmatism correction surface |
| Eighth surface | Glass plate | 0.3 | 64.17 | 1.518 | |
| Ninth surface | Glass plate | 0.74 | 0 | 1 | |
| Image surface | | | | | |

Aspherical Shape

| Aspherical coefficient | Second surface | Third surface | Fourth surface | Fifth surface | Sixth surface |
|---|---|---|---|---|---|
| R | 3.175 | −26.831 | −1.306 | −1.640 | 1.962 |
| K | 0 | 0 | 0 | 0 | 0 |
| A4 | −1.7825E−02 | −3.5500E−02 | 1.0791E−01 | 1.7077E−02 | −7.4160E−02 |
| A6 | −7.4017E−04 | −3.7025E−02 | −9.7194E−02 | −2.4545E−03 | 9.2144E−03 |
| A8 | −9.3846E−03 | 1.1925E−02 | 8.4313E−02 | 1.2895E−02 | −3.6571E−03 |
| A10 | 0.0000E+00 | 0.0000E+00 | 0.0000E+00 | 5.0588E−04 | 0.0000E+00 |

Second lens Fifth Surface Optical Path Difference Function Coefficient

| Aspherical coefficient | Fifth surface |
|---|---|
| C2 | −7.7241E−03 |
| C4 | 1.3012E−03 |
| C6 | −5.8259E−04 |

Astigmatism Correction Surface Shape

| Surface coefficient | j = 1 | j = 2 | j = 3 | j = 4 |
|---|---|---|---|---|
| Surface innermost radius | 0 | 0.247 | 0.83 | 1.13 |
| Dj | 0.000 | 0.02 | −0.02 | 0 |
| Rj | 2.062 | 2.062 | 2.062 | 2.062 |
| Kj | 0.0000E+00 | 0.0000E+00 | 0.0000E+00 | 0.0000E+00 |
| A4j | −4.1757E−02 | −4.1757E−02 | −4.1757E−02 | −4.1757E−02 |
| A6j | −4.3381E−03 | −4.3381E−03 | −4.3381E−03 | −4.3381E−03 |
| A8j | 1.1449E−03 | 1.1449E−03 | 1.1449E−03 | 1.1449E−03 |
| A10j | −3.3252E−04 | −3.3252E−04 | −3.3252E−04 | −3.3252E−04 |

TABLE 2

First Comparative Example
Fno. = 2.8
Focal distance = 4.15 (mm)
Optical Configuration

| Surface number | Remarks | Surface spacing (mm) | Variance value (Abbe number) | Refractive index | Surface shape |
|---|---|---|---|---|---|
| Object surface | Object | 900 | 0 | 1 | |
| Diaphragm surface | Diaphragm | 0.1 | 0 | 1 | |
| Second surface | First lens | 0.92 | 52.85 | 1.546 | Aspheric surface |
| Third surface | First lens | 0.4 | 0 | 1 | Aspheric surface |
| Fourth surface | Second lens | 0.78 | 52.85 | 1.546 | Aspheric surface |
| Fifth surface | Second lens | 0.13 | 0 | 1 | DOE surface |
| Sixth surface | Third lens | 1.0 | 52.85 | 1.546 | Aspheric surface |
| Seventh surface | Third lens | 1.64 | 0 | 1 | Aspheric surface |
| Eighth surface | Glass plate | 0.3 | 64.17 | 1.518 | |
| Ninth surface | Glass plate | 0.7 | 0 | 1 | |
| Image surface | | | | | |

Aspherical Shape

| Aspherical coefficient | Second Surface | Third Surface | Fourth Surface | Fifth Surface | Sixth Surface | Seventh Surface |
|---|---|---|---|---|---|---|
| R | 3.175 | −26.831 | −1.306 | −1.640 | 1.962 | 2.062 |
| K | 0.000 | 0.000 | 0.000 | 0.000 | 0.000 | 0.000 |
| A4 | −1.7825E−02 | −3.5500E−02 | 1.0791E−01 | 1.7077E−02 | −7.4160E−02 | −4.1757E−02 |
| A6 | −7.4017E−04 | −3.7025E−02 | −9.7194E−02 | −2.4545E−03 | 9.2144E−03 | −4.3381E−03 |
| A8 | −9.3846E−03 | 1.1925E−02 | 8.4313E−02 | 1.2895E−02 | −3.6571E−03 | 1.1449E−03 |
| A10 | 0.0000E+00 | 0.0000E+00 | 0.0000E+00 | 5.0588E−04 | 0.0000E+00 | −3.3252E−04 |

Optical Path Difference Function Coefficient

| Aspherical coefficient | Fifth Surface |
|---|---|
| C2 | −7.7241E−03 |
| C4 | 1.3012E−03 |
| C6 | −5.8259E−04 |

TABLE 3

Second Numerical Example
Fno. = 2.8
Focal distance = 3.60 (mm)

| Surface number | Remarks | Surface spacing (mm) | Variance value (Abbe number) | Refractive index | Surface shape |
|---|---|---|---|---|---|
| Object surface | Object | 900 | 0 | 1 | |
| Diaphragm surface | Diaphragm | 0.100 | 0 | 1 | |
| Second surface | First lens | 1.164 | 52.85 | 1.546 | Aspheric surface |
| Third surface | First lens | 0.473 | 0 | 1 | DOE surface |
| Fourth surface | Second lens | 0.922 | 52.85 | 1.546 | Aspheric surface |

TABLE 3-continued

Second Numerical Example
Fno. = 2.8
Focal distance = 3.60 (mm)

| | | | | | |
|---|---|---|---|---|---|
| Fifth surface | Second lens | 1.300 | 0 | 1 | Astigmatism correction surface |
| Sixth surface | Glass plate | 0.3 | 64.17 | 1.518 | |
| Seventh surface | Glass plate | 0.74 | 0 | 1 | |
| Image surface | | | | | |

Aspherical Shape

| Aspherical coefficient | Second surface | Third surface | Fourth surface |
|---|---|---|---|
| R | 7.466 | −50.000 | 1.372 |
| K | 0 | 0 | 0 |
| A4 | −1.0299E−01 | −2.8745E−01 | −2.2469E−01 |
| A6 | 5.9943E−02 | 1.1595E−01 | −3.8421E−02 |
| A8 | −1.5448E−01 | −5.2340E−02 | −1.2174E−02 |
| A10 | 0.0000E+00 | 0.0000E+00 | 0.0000E+00 |

First lens Third Surface Optical
Path Difference Function Coefficient

| | Third surface |
|---|---|
| C2 | −7.1401E−03 |
| C4 | −1.4128E−03 |

Astigmatism Correction Surface Shape

| Surface coefficient | J = 1 | j = 2 | j = 3 | j = 4 |
|---|---|---|---|---|
| Surface innermost radius | 0 | 0.22 | 0.44 | 0.8 |
| Dj | 0.000 | −0.01 | 0.05 | 0 |
| Rj | 1.936 | 1.936 | 1.936 | 1.936 |
| Kj | 0.0000E+00 | 0.0000E+00 | 0.0000E+00 | 0.0000E+00 |
| A4j | −6.6584E−03 | −6.6584E−03 | −6.6584E−03 | −6.6584E−03 |
| A6j | −1.1798E−01 | −1.1798E−01 | −1.1798E−01 | −1.1798E−01 |
| A8j | 5.7224E−02 | 5.7224E−02 | 5.7224E−02 | 5.7224E−02 |
| A10j | −9.6774E−03 | −9.6774E−03 | −9.6774E−03 | −9.6774E−03 |

TABLE 4

Second Comparative Example
Fno. = 2.8
Focal distance = 3.60 (mm)
Optical Configuration

| Surface number | Remarks | Surface spacing (mm) | Variance value (Abbe number) | Refractive index | Surface shape |
|---|---|---|---|---|---|
| Object surface | Object | Infinity | 0 | 1 | |
| Diaphragm surface | Diaphragm | 0.1 | 0 | 1 | |
| Second surface | First lens | 1.16 | 52.85 | 1.546 | Aspheric surface |
| Third surface | First lens | 0.47 | 0 | 1 | DOE surface |
| Fourth surface | Second lens | 0.92 | 52.85 | 1.546 | Aspheric surface |
| Fifth surface | Second lens | 1.3 | 0 | 1 | Aspheric surface |
| Sixth surface | Glass plate | 0.3 | 64.17 | 1.518 | |

TABLE 4-continued

Second Comparative Example
Fno. = 2.8
Focal distance = 3.60 (mm)
Optical Configuration

| | | | | |
|---|---|---|---|---|
| Seventh surface Image surface | Glass plate | 0.74 | 0 | 1 |

Aspherical Shape

| Aspherical coeffic | Second surface | Third surface | Fourth surface | Fifth surface |
|---|---|---|---|---|
| R | 7.466 | −50 | 1.372 | 1.9362 |
| K | 0 | 0 | 0 | 0 |
| A4 | −1.0299E−01 | −2.8745E−01 | −2.2469E−01 | −6.6584E−03 |
| A6 | 5.9943E−02 | 1.1595E−01 | −3.8421E−02 | −1.1798E−01 |
| A8 | −1.5448E−01 | −5.2340E−02 | −1.2174E−02 | 5.7224E−02 |
| A10 | 0.0000E+00 | 0.0000E+00 | 0.0000E+00 | −9.6774E−03 |

First lens Third Surface Optical
Path Difference Function Coefficient

| | Third surface |
|---|---|
| C2 | −7.1401E−03 |
| C4 | −1.4128E−03 |

TABLE 5

First Conventional Example
Fno. = 2.8
Focal distance = 1.96 (mm)
Optical Configuration

| Surface number | Remarks | Surface spacing (mm) | Variance value (Abbe number) | Refractive index | Surface shape |
|---|---|---|---|---|---|
| Object surface | Object | 500 | 0 | 1 | |
| Diaphragm surface | Diaphragm | 0.25 | 0 | 1 | |
| Second surface | First lens | 1.65 | 56.74 | 1.494 | Aspheric surface |
| Third surface | First lens | 1.0 | 0 | 1 | DOE surface |
| Fourth surface | Glass plate | 0.3 | 64.17 | 1.518 | |
| Fifth surface Image surface | Glass plate | 0.3 | 0 | 1 | |

Aspherical Shape

| Aspherical coeffic | Second surface | Third surface |
|---|---|---|
| R | 2.428 | −1.361 |
| K | −0.371 | −10.284 |
| A4 | −9.6995E−03 | −2.4687E−01 |
| A6 | 1.0087E−01 | 2.6208E−01 |
| A8 | −1.5045E−01 | −1.3874E−01 |
| A10 | 2.0026E−02 | 4.0346E−02 |

Optical Path Difference Function Coefficient

| Aspherical coeffic | Second surface |
|---|---|
| C2 | −1.6825E−02 |
| C4 | −1.1202E−02 |

TABLE 5-continued

First Conventional Example
Fno. = 2.8
Focal distance = 1.96 (mm)
Optical Configuration

| | |
|---|---|
| C6 | 1.9336E−02 |
| C8 | −1.1003E−02 |

TABLE 6

Second Conventional Example
Fno. = 2.7
Focal distance = 3.514 mm

| Surface number | Remarks | Surface spacing (mm) | Surface shape |
|---|---|---|---|
| Object surface | Object | 500 | |
| Diaphragm surface | Diaphragm | 0.1 | |
| Second surface | First lens | 0.863 | Aspheric surface |
| Third surface | First lens | 0.428 | Aspheric surface |
| Fourth surface | Second lens | 1.188 | Aspheric surface |
| Fifth surface | Second lens | 1.05 | DOE surface |
| Eighth surface | Glass plate | 0.3 | |
| Ninth surface | Glass plate | 0.74 | |
| Image surface | Sensor surface | | |

Aspherical Shape

| Aspherical coeffic | Second surface | Third surface | Fourth surface | Fifth surface |
|---|---|---|---|---|
| R | 1.473 | 1.605 | 2.861 | −15.788 |
| K | 0 | 0 | 0 | 0 |
| A4 | −0.3160E−01 | −0.2545E−01 | −0.1233E−01 | 0.1974E−01 |
| A6 | 0.3599E−01 | 0.7511E−02 | −0.2533E−01 | −0.1060E−01 |
| A8 | −0.1967E−01 | 0.6067E−01 | 0.5044E−2 | −0.1637E−02 |
| A10 | 0 | −0.2344E−01 | 0 | 0.3052E−03 |

Optical Path Difference Function Coefficient

| | Fifth surface |
|---|---|
| C2 | −1.8769E−02 |
| C4 | 9.7000E−03 |
| C6 | −2.4347E−03 |

TABLE 7

Third Numerical Example
Fno. = 2.8
Focal distance = 4.15 (mm)

| Surface number | Remarks | Surface spacing (mm) | Variance value (Abbe number) | Refractive index | Surface shape |
|---|---|---|---|---|---|
| Object surface | Object | 900 | 0 | 1 | |
| Diaphragm surface | Diaphragm | 0.100 | 0 | 1 | |
| Second surface | First lens | 0.912 | 52.85 | 1.546 | Aspheric surface |
| Third surface | First lens | 0.400 | 0 | 1 | Aspheric surface |
| Fourth surface | Second lens | 0.776 | 52.85 | 1.546 | Aspheric surface |
| Fifth surface | Second lens | 0.134 | 0 | 1 | DOE surface |

TABLE 7-continued

Third Numerical Example
Fno. = 2.8
Focal distance = 4.15 (mm)

| | | | | | |
|---|---|---|---|---|---|
| Sixth surface | Third lens | 1.000 | 52.85 | 1.546 | Aspheric surface |
| Seventh surface | Third lens | 1.639 | 0 | 1 | Astigmatism correction surface |
| Eighth surface | Glass plate | 0.3 | 64.17 | 1.518 | |
| Ninth surface | Glass plate | 0.74 | 0 | 1 | |
| Image surface | | | | | |

Aspherical Shape

| Aspherical coeffic | Second surface | Third surface | Fourth surface | Fifth surface | Sixth surface |
|---|---|---|---|---|---|
| R | 3.175 | −26.831 | −1.306 | −1.640 | 1.962 |
| K | 0 | 0 | 0 | 0 | 0 |
| A4 | −1.7825E−02 | −3.5500E−02 | 1.0791E−01 | 1.7077E−02 | −7.4160E−02 |
| A6 | −7.4017E−04 | −3.7025E−02 | −9.7194E−02 | −2.4545E−03 | 9.2144E−03 |
| A8 | −9.3846E−03 | 1.1925E−02 | 8.4313E−02 | 1.2895E−02 | −3.6571E−03 |
| A10 | 0.0000E+00 | 0.0000E+00 | 0.0000E+00 | 5.0588E−04 | 0.0000E+00 |

Second lens Fifth surface Optical Path Difference Function Coefficient

| | Third surface |
|---|---|
| C2 | −7.7241E−03 |
| C4 | 1.3012E−03 |
| C6 | −5.8259E−04 |

Astigmatism Correction Surface Shape

| Surface coefficient | j = 1 | j = 2 | j = 3 | j = 4 |
|---|---|---|---|---|
| Surface innermost radius | 0 | 0.247 | 0.83 | 1.13 |
| dj | 0.000 | 0.02 | −0.02 | 0 |
| Rj | 2.060 | 2.038 | 2.066 | 2.089 |
| kj | 0.0000E+00 | 0.0000E+00 | 0.0000E+00 | 0.0000E+00 |
| A4j | −4.0645E−03 | −4.3041E−02 | −4.2244E−02 | −3.8041E−02 |
| A6j | −5.8200E−01 | −6.5043E−03 | −4.1664E−03 | −5.1898E−03 |
| A8j | −5.4110E−01 | 5.8014E−03 | 1.3850E−03 | 1.1279E−03 |
| A10j | 4.7682E+01 | −3.0227E−03 | −4.4395E−04 | −2.7708E−04 |

TABLE 8

Fourth Numerical Example
Fno. = 2.8
Focal distance = 3.50 (mm)

| Surface number | Remarks | Surface spacing (mm) | Variance value (Abbe number) | Refractive index | Surface shape |
|---|---|---|---|---|---|
| Object surface | Object | Infinity | 0 | 1 | |
| Diaphragm surface | Diaphragm | 0.1 | 0 | 1 | |
| Second surface | First lens | 1.16 | 52.85 | 1.546 | Aspheric surface |
| Third surface | First lens | 0.47 | 0 | 1 | DOE surface |
| Fourth surface | Second lens | 0.92 | 52.85 | 1.546 | Aspheric surface |
| Fifth surface | Second lens | 0.13 | 0 | 1 | Astigmatism correction surface |
| Sixth surface | Glass plate | 0.3 | 64.17 | 1.518 | |

TABLE 8-continued

Fourth Numerical Example
Fno. = 2.8
Focal distance = 3.50 (mm)

| Seventh surface Image surface | Glass plate | 0.74 | 0 | 1 |

Aspherical Shape

| Aspherical coeffic | Second surface | Third surface | Fourth surface |
|---|---|---|---|
| R | 7.465 | −50 | 1.372 |
| K | 0 | 0 | 0 |
| A4 | −1.0299E−01 | −2.8745E−02 | −2.2469E−01 |
| A6 | 5.9943E−02 | 1.1595E−01 | −3.8421E−02 |
| A8 | −1.5448E−01 | −5.2340E−02 | −1.2174E−02 |
| A10 | 0.0000E+00 | 0.0000E+00 | 0.0000E+00 |

Second lens Fifth surface Optical
Path Difference Function Coefficient

| | Third surface |
|---|---|
| C2 | −7.1401E−03 |
| C4 | −1.4128E−03 |

Astigmatism Correction Surface Shape

| Surface coefficient | j = 1 | j = 2 | j = 3 | j = 4 |
|---|---|---|---|---|
| Surface innermost radius | 0 | 0.22 | 0.44 | 0.8 |
| dj | 0.000 | −0.01 | 0.05 | 0 |
| Rj | 2.033 | 1.959 | 1.912 | 1.922 |
| kj | 0.0000E+00 | 0.0000E+00 | 0.0000E+00 | 0.0000E+00 |
| A4j | 2.8778E−01 | −3.5750E−03 | −4.9428E−04 | −1.7978E−02 |
| A6j | −2.8490E+00 | −1.0706E−01 | −1.2722E−01 | −1.0350E−01 |
| A8j | 5.7224E−02 | 3.1393E−01 | 5.8942E−02 | 4.9501E−02 |
| A10j | −9.6774E−03 | −1.1851E+00 | −6.3799E−03 | −8.2582E−03 |

The invention claimed is:

1. An imaging optical system which has at least one lens, at least one surface of the at least one lens being divided into at least one band region surrounding a periphery of an optical axis and a center region including the optical axis, wherein a boundary between the at least one band region and the center region is defined by a circle having the center located on the optical axis and a step is provided at the boundary such that a meridional image plane is brought close to a reference image plane of the imaging optical system.

2. The imaging optical system according to claim 1, wherein a size of the step is defined by magnitude of the displacements of the first and second regions from the reference image surface, and an orientation of the step is defined based on which orientations the first and second regions are displaced toward from the reference image surface, whether the surface including the step is located on the image side or the object side, and whether the surface including the step is formed in a concave surface or a convex surface.

3. The imaging optical system according to claim 1, wherein the surfaces constituting the at least one band region and center region are separately obtained.

4. The imaging optical system according to claim 1, wherein the step in an optical axis direction is obtained by changing a position of an origin on each surface, when the surfaces constituting the at least one band region and center region including the optical axis are expressed by a defining equation in which an intersection point of each surface and the optical axis is set to the origin.

5. The imaging optical system according to claim 3, wherein shapes of the surfaces are separately obtained by changing a defining equation of the surfaces constituting the at least one band region and center region including the optical axis, when the surfaces constituting the at least one band region and center region are expressed by the defining equation in which an intersection point of each surface and the optical axis is set to the origin.

6. The imaging optical system according to claim 1, wherein the surfaces constituting the at least one band region and center region are defined by an aspherical equation.

7. The imaging optical system according to claim 1, wherein an inclination of a step surface at the boundary between the center region and the band region or between the plurality of band regions is obtained as a function of an angle of a ray transmitted through the boundary portion.

8. The imaging optical system according to claim 7, wherein the inclination of the step surface is obtained with respect to the optical axis so as to be set to an angle ranging from a minimum angle to a maximum angle of the ray incident to the step surface, when the step surface at the boundary between the center region and the band region or between the plurality of band regions is parallel to the optical axis.

9. The imaging optical system according to claim 7, wherein the inclination of the step surface is obtained with respect to the optical axis so as to be set to an average angle of the ray incident to the step surface, when the step surface at the boundary between the center region and the band region or between the plurality of band regions is parallel to the optical axis.

10. The imaging optical system according to claim 1, wherein the at least one band region and the periphery of the center region are defined by a circle having the center located on the optical axis.

11. The imaging optical system according to claim 1, wherein a diffractive element is provided in at least one surface of at least one optical element.

12. The imaging optical system according to claim 1, wherein the at least one band region and the center region are included in a surface located closest to the image side.

13. An imaging optical system which has at least one lens, at least one surface of the at least one lens being divided into at least one band region surrounding a periphery of an optical axis and a center region including the optical axis, wherein a step is provided at a boundary between the at least one band region and the center region such that a region of a meridional image surface is brought close to a reference image surface of the imaging optical system, when the region is displaced from the reference image surface toward an image side or an object side, a meridional ray transmitted through at least one of the at least one band region and the center region being imaged onto the region in the meridional image surface.

14. The imaging optical system according to claim 13, wherein a size of the step is defined by magnitude of the displacements of the region of the meridional image surface from the reference image surface, and an orientation of the step is defined based on which orientation the region is displaced toward from the reference image surface, which the surface including the step is located on the image side or the object side, and which the surface including the step is formed in a concave surface or a convex surface.

15. The imaging optical system according to claim 13, wherein the surfaces constituting the at least one band region and center region are separately obtained.

* * * * *